US009884624B2

United States Patent
Morita et al.

(10) Patent No.: US 9,884,624 B2
(45) Date of Patent: Feb. 6, 2018

(54) TRAVEL CONTROL DEVICE

(71) Applicant: Mitsubishi Electric Corporation, Tokyo (JP)

(72) Inventors: Shigeki Morita, Tokyo (JP); Hisashi Sugawara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 5 days.

(21) Appl. No.: 15/023,741

(22) PCT Filed: Dec. 10, 2013

(86) PCT No.: PCT/JP2013/083094
§ 371 (c)(1),
(2) Date: Mar. 22, 2016

(87) PCT Pub. No.: WO2015/087395
PCT Pub. Date: Jun. 18, 2015

(65) Prior Publication Data
US 2016/0229402 A1    Aug. 11, 2016

(51) Int. Cl.
*B60W 30/165*        (2012.01)
*G08G 1/16*          (2006.01)
(Continued)

(52) U.S. Cl.
CPC .......... *B60W 30/165* (2013.01); *B60W 30/17* (2013.01); *G01S 13/931* (2013.01);
(Continued)

(58) Field of Classification Search
CPC ... B60W 30/165; B60W 30/17; G01S 13/931; G01S 13/91; G08G 1/096725;
(Continued)

(56) References Cited

U.S. PATENT DOCUMENTS 9,092,986 B2 * 7/2015 Salomonsson ......... G08G 1/167
9,318,020 B2 * 4/2016 Salomonsson ... G08G 1/096725
(Continued)

FOREIGN PATENT DOCUMENTS

JP    2010-257139 A    11/2010
JP    2011-95828 A      5/2011
(Continued)

OTHER PUBLICATIONS

International Search Report for PCT/JP2013/083094 dated Feb. 10, 2014.
(Continued)

*Primary Examiner* — Frederick Brushaber
(74) *Attorney, Agent, or Firm* — Sughrue Mion, PLLC; Richard C. Turner

(57) ABSTRACT

A travel control device 10 includes: an intersection stopped vehicle determining unit 12 that determines whether or not a forward vehicle is a stopped vehicle that is stopped at an intersection, based on distance information from the own vehicle to each forward vehicle acquired by a forward vehicle detection device 1, and distance information to the intersection existing ahead of the own vehicle acquired by a forward intersection distance acquisition device 2; and a vehicle stop position prediction unit 13 that predicts a stop position of the own vehicle at the intersection based on distance information of the stopped vehicle, when the forward vehicle is determined as the stopped vehicle.

12 Claims, 10 Drawing Sheets

(51) Int. Cl.
  *G08G 1/0967* (2006.01)
  *G01S 13/93* (2006.01)
  *B60W 30/17* (2012.01)
  *G01S 13/91* (2006.01)

(52) U.S. Cl.
  CPC . *G08G 1/096725* (2013.01); *G08G 1/096758* (2013.01); *G08G 1/096783* (2013.01); *G08G 1/163* (2013.01); *G08G 1/166* (2013.01); *G01S 13/91* (2013.01)

(58) Field of Classification Search
  CPC .. G08G 1/096758; G08G 1/163; G08G 1/166; G08G 1/096783
  See application file for complete search history.

(56) References Cited

U.S. PATENT DOCUMENTS

| | | | | |
|---|---|---|---|---|
| 9,557,736 | B1* | 1/2017 | Silver | B60Q 1/486 |
| 9,672,734 | B1* | 6/2017 | Ratnasingam | G08G 1/0112 |
| 2006/0267502 | A1* | 11/2006 | Kubota | B60Q 1/143 |
| | | | | 315/82 |
| 2006/0293819 | A1* | 12/2006 | Harumoto | B60W 40/072 |
| | | | | 701/41 |
| 2007/0118282 | A1* | 5/2007 | Yamamoto | B60T 7/22 |
| | | | | 701/1 |
| 2010/0292886 | A1* | 11/2010 | Szczerba | G01C 21/365 |
| | | | | 701/31.4 |
| 2011/0106391 | A1 | 5/2011 | Shida | |
| 2012/0062743 | A1* | 3/2012 | Lynam | B60Q 9/005 |
| | | | | 348/148 |
| 2012/0188098 | A1* | 7/2012 | Mochizuki | G08G 1/096783 |
| | | | | 340/905 |
| 2012/0218412 | A1* | 8/2012 | Dellantoni | G01C 21/3602 |
| | | | | 348/148 |
| 2014/0046581 | A1 | 2/2014 | Ota et al. | |
| 2014/0222280 | A1* | 8/2014 | Salomonsson | G08G 1/167 |
| | | | | 701/28 |
| 2015/0268665 | A1* | 9/2015 | Ludwick | B60Q 5/008 |
| | | | | 701/23 |

FOREIGN PATENT DOCUMENTS

| | | |
|---|---|---|
| JP | 2011-154619 A | 8/2011 |
| JP | 2011-192177 A | 9/2011 |
| JP | 2012-146252 A | 8/2012 |
| JP | 5088444 B2 | 12/2012 |
| JP | 2013-167510 A | 8/2013 |
| WO | 2010/100725 A1 | 9/2010 |
| WO | 2012/144255 A1 | 10/2012 |

OTHER PUBLICATIONS

Communication dated Oct. 25, 2017 from the State Intellectual Property Office of the P.R.C., in counterpart Chinese application No. 2013 8008 1615.5.

* cited by examiner

TRAVEL CONTROL DEVICE

CROSS REFERENCE TO RELATED APPLICATIONS

This application is a National Stage of International Application No. PCT/JP2013/083094 filed Dec. 10, 2013, the contents of which are incorporated herein by reference in their entirety.

TECHNICAL FIELD

The present invention relates to a travel control device having a follow-up traveling function with respect to a forward vehicle.

BACKGROUND ART

In a travel control device that makes a vehicle travel automatically at a speed set by a driver, the following travel control technique called adaptive auto cruise as been put into practical use: a distance between the own vehicle and a forward vehicle is detected by a sensor, and when the forward vehicle approaches the own vehicle to a certain extent, the speed of the own vehicle is adjusted in accordance with the speed of the forward vehicle. In recent years, a travel control device has also been put into practical use that performs not only output adjustment of a power train but also brake control, having a function that stops the own vehicle when the forward vehicle is decelerated or stopped.

Since the above-mentioned typical travel control device controls the travel speed of the own vehicle based on a distance and a speed relative to the nearest forward vehicle, it is readily affected by acceleration and deceleration of the nearest forward vehicle, as compared to a case where an experienced driver determines states of a plurality of forward vehicles to thus adjust the speed of the own vehicle, so that there are some cases to cause rapid acceleration and deceleration. Therefore, a follow-up travel control device of Patent Document 1 discloses that calculates a relative positional relationship to not only the nearest forward vehicle but also a plurality of vehicles to thus control the own vehicle, whereby a follow-up travel considering movements the plurality of vehicles can be achieved.

In addition, in order to support a driving for improving fuel economy when a vehicle is stopped in the case where the signal is red at a signalized intersection, a driving support device of Patent Document 2 discloses a configuration which obtains information of signals and vehicle information existing near a stop line via communication from an infrastructure (hereinafter abbreviated to infra), predicts a position in which the own vehicle will stop, to thus carry out the driving for improving fuel economy.

Likewise, a driving support device of Patent Document 3 discloses the following configuration: from signal information and the length of a line of vehicles stopping at an intersection, the timing when the line of the stopped vehicles starts at the time of changing to a green signal is predicted to thus provide a driver with a speed that the own vehicle can pass through the intersection without stop.

CITATION LIST

Patent Document

Patent Document 1: WO 2010/100725
Patent Document 2: Japanese Patent Application Laid-open
Patent Document 3: WO 2012/144255

SUMMARY OF THE INVENTION

Problems to be Solved by the Invention

The aforementioned technique of Patent Document 1 adopts a millimeter radar as an example of a sensor for detecting the plurality of forward vehicles. When the plurality of vehicles ahead of the nearest forward vehicle are detected using the millimeter radar, an electric wave arrives at the forward vehicle through a gap between the vehicle and a road surface, by reflection of the road surface, and so on, and the reflected electric wave is received, so that the radar can detect a vehicle which cannot seen by a driver directly.

Due to the principle of the radar, a distance and a speed obtained from the Doppler frequency can be detected relatively accurately even to the aforementioned vehicle that cannot be seen directly; however, accuracy of the direction obtained from a difference in strength of the electric waves is deteriorated greatly as compared to that of the nearest forward vehicle. For this reason, in a general road such that a large number of parked vehicles are present, which of the following situations cannot be determined: when the vehicle stopping ahead of the nearest forward vehicle is a stopped vehicle stopping on the same lane with the own vehicle in accordance with the red signal of the intersection, the own vehicle is in a situation that deceleration is required; and when it is a parked vehicle, the own vehicle is in a situation that can pass through its side without deceleration; consequently, deceleration to the vehicle ahead of the nearest forward vehicle cannot be practically carried out, so that deceleration relying on only the information of the nearest forward vehicle can merely be implemented.

In addition, the driving support devices of the techniques disclosed in Patent Document 2 and Patent Document 3, it is necessary to receive signal information and stopped vehicle information via the communication from the infrastructure side. For this reason, there is a problem such that only vehicles equipped with the corresponding vehicle-mounted device can be supported at the intersection installed with infrastructure equipment such as a signal, vehicle detection equipment, and communication equipment.

The present invention is made to solve the above-described problem, and an object thereof is to provide a travel control device that, even in a state that the nearest forward vehicle is not decelerated or stopped in the intersection at which the infrastructure equipment is not installed, enables a start of deceleration of the own vehicle according to a state of a vehicle ahead of the nearest one.

Means for Solving the Problems

A travel control device of the present invention includes: an intersection stopped vehicle determiner that determines whether or not a forward vehicle is a stopped vehicle that is stopped at an intersection, based on distance information from the own vehicle to each forward vehicle, and distance information to the intersection existing ahead of the own vehicle; and a vehicle stop position predictor that predicts a stop position of the own vehicle at the intersection based on distance information of the stopped vehicle, when the forward vehicle is determined as the stopped vehicle by the intersection stopped vehicle determiner.

Effect of the Invention

According to the present invention, it is configured such that whether one or more forward vehicles existing ahead of the own vehicle are stopped vehicles stopping at the intersection or parked vehicles is determined, and that when they are stopped vehicles stopping at the intersection, the stop position of the own vehicle at the intersection is predicted based on the positions of the stopped vehicles; thus, not depending on deceleration of the followed vehicle, and even if infrastructure equipment is absent at the intersection, it becomes possible to perform deceleration driving using the stop position of the own vehicle at the intersection as a target. Therefore, even in a state that the nearest forward vehicle is not decelerated or stopped at the intersection without any infrastructure equipment, a travel control device can be provided that enables a start of deceleration of the own vehicle when a vehicle ahead of the nearest one is stopped.

MODES FOR CARRYING OUT THE INVENTION

Hereinafter, for illustrating the invention in more detail, an embodiment for carrying out the invention will be described according to the accompanying drawings.

Embodiment 1

Figure 1:
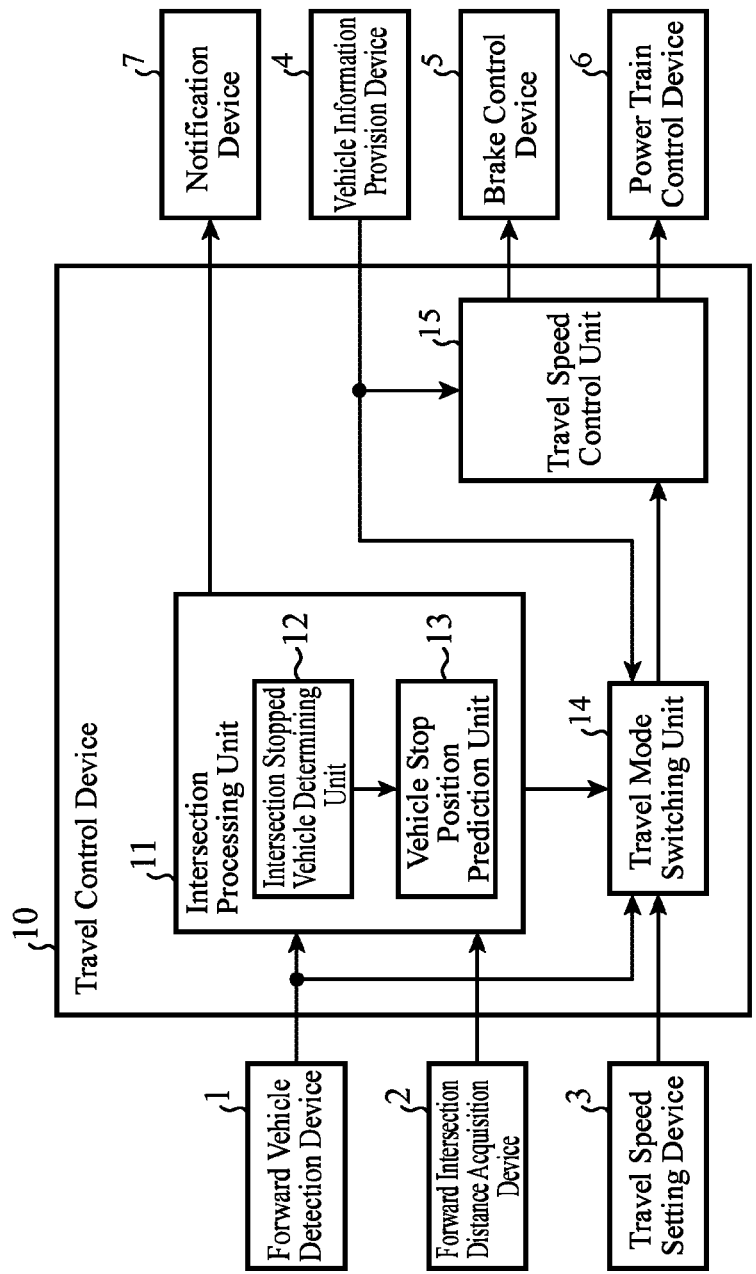
FIG. 1 is a block diagram showing a configuration of a travel control device according to an embodiment 1.

FIG. 1 is a block diagram showing a configuration of a travel control device 10 according to an embodiment 1 of the present invention.

The travel control device 10 is configured of: an intersection processing unit 11 having an intersection stopped vehicle determining unit 12 and a vehicle stop position prediction unit 13; a travel mode switching unit 14; and a travel speed control unit 15, and is connected to a forward vehicle detection device 1, a forward intersection distance acquisition device 2, a travel speed setting device 3, a vehicle information provision device 4, a brake control device 5, a power train control device 6, and a notification device 7 as external devices. These external devices may be incorporated in the travel control device 10. Alternatively, part or all of the components of the travel control device 10 may be incorporated in the external devices.

The hardware of the travel control device 10 is constituted by the same components as those of a general ECU (Electronic Control Unit) for automobile, such as a CPU (Central Processing Unit) that performs calculation processing, a memory that records information, a power source device, and a communication interface that performs communication with external devices. Additionally, though each of the individual components in the travel control device 10 is described separately for convenience of explanation of the present invention, the calculation processing of the individual components may be performed collectively by one CPU.

The forward vehicle detection device 1 is constituted by, for example, a millimeter radar and so on, and detects a relative distance, a relative speed, and a relative direction to the own vehicle with respect to a plurality of vehicles ahead of the own vehicle.

Since it is only needed that the forward vehicle detection device 1 can detect the distance, speed, and direction of the forward vehicle, it may obtain each other's vehicle position information using communication means via an inter-vehicle communication or a server such as telematics, without using a vehicle-mounted sensor such as the millimeter radar.

Further, in a case where the forward vehicle detection device 1 includes the communication means, when it approaches an intersection or the like installed with a vehicle detection device and a communication device on an infrastructure side and can receive information on the infrastructure side, the vehicle positions around the intersection included in the information received from the infrastructure side may be used.

The forward intersection distance acquisition device 2 detects an intersection ahead of a position of the own vehicle using map data incorporated in a car navigation device, for example, and acquires a route distance therebetween.

The route distance is a distance along a road, and in a curve, it corresponds to the distance along its curve shape.

Since it is only needed that the forward intersection distance acquisition device 2 can acquire the route distance to the intersection, the route distance to the intersection may be acquired by making reference to the map data existing on a server via the communication means such as a smart phone, without using the map data of the vehicle-mounted navigation device and so on, or map data downloaded preliminarily on the smartphone may be used.

Further, the forward intersection distance acquisition device 2, when approaching the intersection and so on installed with the communication means on the infrastructure side and being able to receive the information on the infrastructure side, it may use road alignment information of the intersection included in the information received from the infrastructure side (the distance to the intersection, the road shape, the size of intersection, the position of a stop line, and so on).

The travel speed setting device 3 is constituted by, for example, a speed setting switch for auto cruise equipped on the steering, and sets the speed of the own vehicle at the time the switch is pressed to a travel speed.

Since it is only needed that the travel speed setting device 3 can perform the setting of the travel speed, an upper limit speed of, for example, a regulation speed that is preset in the map data of the car navigation device, a regulation speed obtained via the communication means, a regulation speed obtained by recognition of a road sign, or the like may be set to the travel speed.

In addition, the travel speed setting device 3 may have a function varying to a proper speed lower than the regulation speed in travelling a curve or the like using the map data of the car navigation device and so on.

Further, in traveling a road in which a communication device is installed on the infrastructure side, the travel speed setting device 3 may set to the travel speed a speed designated from the communication device installed at a tunnel, or a place, called a sag part, whose gradient changes and in which congestion occurs readily.

The vehicle information provision device 4 collects the travel speed of the own vehicle, a gear position, a type of a driving source (for instance, an internal combustion engine or a motor), as well as information of presence or absence of brake and accelerator operations of a driver, and provides them to the travel control device 10.

The intersection stopped vehicle determining unit 12 of the intersection processing unit 11 determines whether a plurality of forward vehicles are parked vehicles, or stopped vehicles stopping due to a red signal or a stop sign of the forward intersection, from distance information of the plurality of forward vehicles detected by the forward vehicle detection device 1 and the route distance to the forward intersection obtained by the forward intersection distance acquisition device 2.

When the intersection stopped vehicle determining unit 12 determines that a stopped vehicle exists at the forward intersection, the vehicle stop position prediction unit 13 of the intersection processing unit 11 predicts positions in which the own vehicle and the forward vehicle approach the stopped vehicle and stop. In addition, for example, in a case where the stop of the own vehicle at the forward intersection is predicted, the vehicle stop position prediction unit 13 notifies the driver of that effect via the notification device 7.

Detailed operations of a stopped vehicle determining method of the intersection stopped vehicle determining unit 12 and a vehicle stop position prediction method of the vehicle stop position prediction unit 13 will be described separately.

The travel mode switching unit 14 switches travel modes such as a set speed travel mode, an intersection deceleration mode, and a forward vehicle follow-up travel mode, and also calculates a target speed in the switched travel mode and reports the calculation result to the travel speed control unit 15. Various types of travel modes and calculation methods of the target speed will be described separately; for example, in the intersection deceleration mode, the travel mode switching unit 14 calculates a change of the target speed up to a stop at the forward intersection, from the information of the forward vehicle detection device 1, the information of the travel speed setting device 3, the information of the intersection processing unit 11, and the speed of the own vehicle provided from the vehicle information provision device 4, and outputs the result to the travel speed control unit 15 one by one.

The travel speed control unit 15 outputs an instruction to the brake control device 5 and power train control device 6 so that the speed of the own vehicle provided from the vehicle information provision device 4 can meet the target speed outputted from the travel mode switching unit 14.

These travel mode switching unit 14 and travel speed control unit 15 cooperates with each other to thus achieve an auto cruise function.

The brake control device 5 controls the brake when deceleration impracticable by engine brake and so on is required, and actuates the brake based on the instruction of the travel speed control unit 15 to adjust deceleration of the own vehicle.

The power train control device 6 controls an output of a power train such as engine output or motor output, and change gear ratio of a transmission, and adjusts the acceleration and deceleration of the own vehicle by controlling the output of the power train based on the instruction of the travel speed control unit 15.

The notification device 7 is constituted by, for example, a display device or an audio output device, and receives an instruction from the intersection processing unit 11 when the stop of the own vehicle at the forward intersection is predicted, for example, and notifies the driver of that effect by displays, voices, alerting sounds (buzzers etc.), and the like.

First, referring to FIGS. 2 and 3, an outline of the operation of the travel control device 10 according to the embodiment 1 of the present invention will be described.

Figure 2:
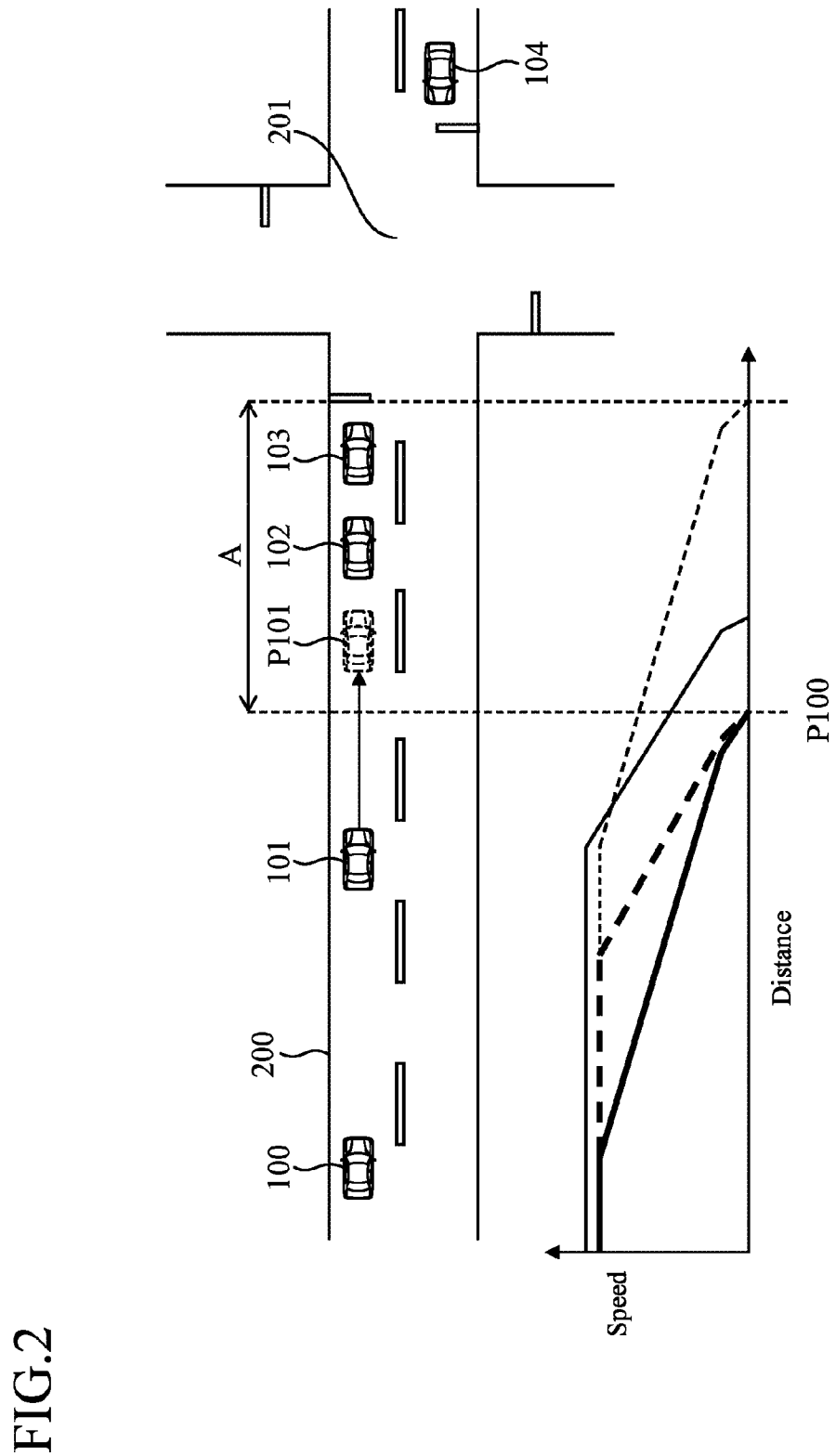
FIG. 2 is a diagram illustrating a deceleration example at an intersection in using the travel control device according to the embodiment 1.

FIG. 2 shows a deceleration example at an intersection when the travel control device 10 is used. However, details of the stop position estimation range A shown in FIG. 2 will be described later.

In a road map shown at an upper part of FIG. 2, since the own vehicle 100 is travelling a road 200 within a regulation speed, and a preceding vehicle 101 is travelling at a slightly higher speed ahead of the own vehicle 100, it is not a follow-up state; however, because the travel control device 10 performs the same operation irrespective of the follow-up state, a description of the follow-up state will be omitted.

Though the preceding vehicle 101 during following or following from now on does not start decelerating yet, preceding vehicles 101 and 103 ahead of the preceding vehicle 101 is in a stopping state at the forward intersection 201 due to the red signal (not shown) or stop sign. An opposing vehicle 104 is stopping at the forward intersection 201 due to the red signal and so on.

Changes of speed and distance of the own vehicle 100 and the preceding vehicle 101 are shown in a graph at a lower part of FIG. 2. Note that the distance along the horizontal axis in the graph corresponds to the distance on the road 200.

Additionally, in a case where the vehicle decelerates at a constant ratio, the speed change is linear if the horizontal axis of the graph indicates the time, while it becomes a curve as a result of integration because the horizontal axis indicates the distance. Though the speed change is given by Polylines in FIG. 2, and FIG. 3 and FIG. 4 described later for simplification of explanation, strictly speaking, it becomes quadratic curves.

A thin line indicates the speed change of the preceding vehicle 101, and a thick dashed line indicates the speed change of the own vehicle 100 by a conventional follow-up travel mode (auto cruise). In a conventional auto cruise function, the preceding vehicle 101 starts decelerating, and an approach thereof to the own vehicle 100 is detected, and then the own vehicle 100 decelerates in a similar manner in accordance with the deceleration of the preceding vehicle 101; thus, when the preceding vehicle 101 performs a strong deceleration, the deceleration of the own vehicle 100 also becomes a strong one, which deteriorates riding comfort.

Further, an output of the power train is maintained till the start of the deceleration, resulting in wasteful energy consumption.

On the other hand, in the intersection deceleration mode according the present invention (indicated by a thick sold line in FIG. 2), even if the preceding vehicle 101 does not start decelerating, when stoppings of the preceding vehicle 102 and preceding vehicle 103 on this side of the forward intersection 201 are detected, it is determined that the preceding vehicle 102 and preceding vehicle 103 are the ones that stop temporarily at the forward intersection 201 due to the red signal and so on; thus, it is determined that the preceding vehicle 101 needs to stop at a place behind the preceding vehicle 102, and it is determined that the own vehicle 100 needs to stop further behind that place, and thus the stop position of the own vehicle 100 (prediction stop position P100 shown in FIG. 2) is predicted.

In a case where it stops at a stop line in a state where no preceding vehicles 101 to 103 exist, a speed change is indicated by a thin dashed line when the following driving for improving fuel economy is carried out: an accelerator is turned off early and engine brake is activated, whereby a section in which energy is not consumed by fuel cut is allowed to be extended. In order to carry out the driving for improving fuel economy in a similar manner even if the preceding vehicles 101 to 103 exist, in the intersection deceleration mode of the invention, the driving for improving fuel economy is performed such that even in a state where the preceding vehicle 101 does not start decelerating, the accelerator is turned off using the prediction stop position P100 of the own vehicle 100 as a target, and the engine brake is activated, whereby the speed change indicated by the thick solid line is attained.

As described above, in the present invention, the driving for improving fuel economy with a comfortable ride can be achieved even during follow-up travel by changing the travel mode near an intersection.

Figure 3:
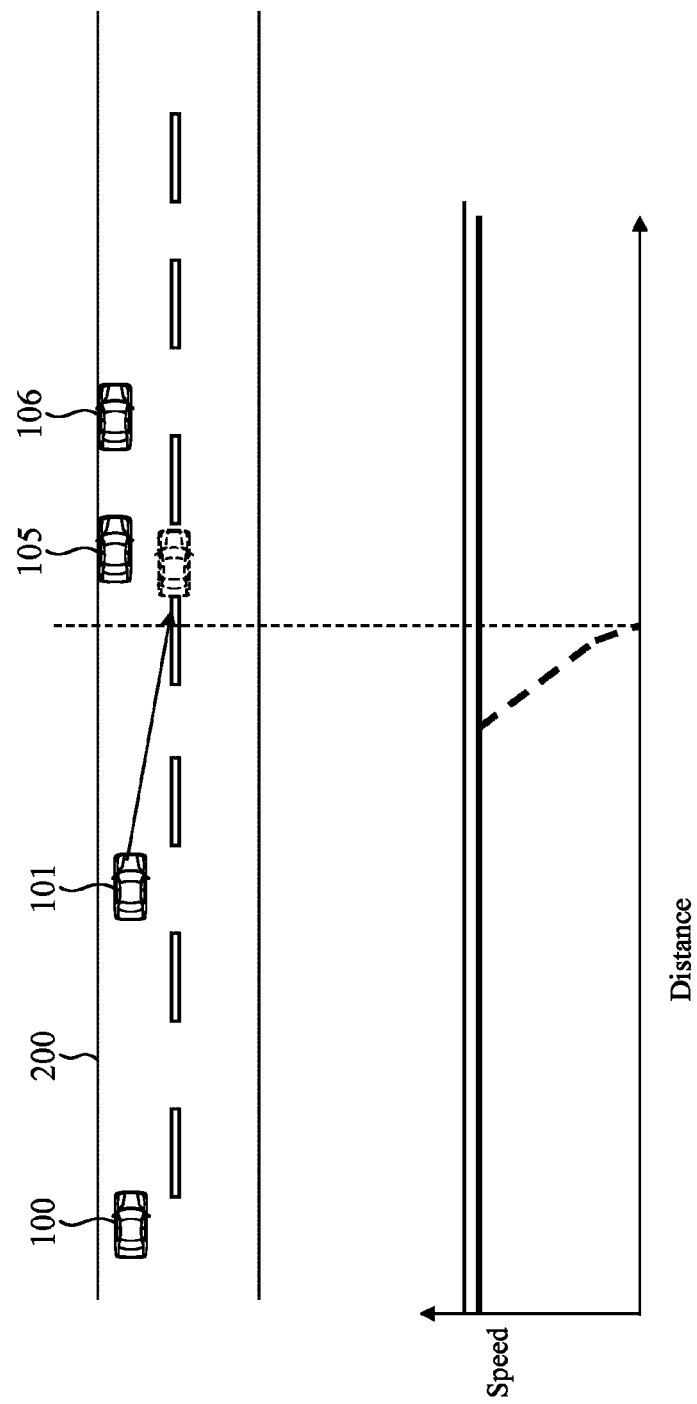
FIG. 3 is a diagram illustrating a deceleration example at a place other than the intersection in using the travel control device according to the embodiment 1.

Next, a deceleration example other than the intersection is shown in FIG. 3. Similar to FIG. 2, the own vehicle 100 is traveling the road 200 within a regulation speed, and the preceding vehicle 101 is travelling at a slightly higher speed. The parked vehicles 105, 106 are the vehicles parked at a road edge. Changes of speed and distance of the own vehicle 100 and the preceding vehicle 101 are shown in a graph at a lower part of FIG. 3. A thick line indicates the speed of the own vehicle 100, and a thin line indicates the speed of the preceding vehicle 101. When in approaching a parked vehicle 105, in a case where the preceding vehicle 101 can pass it easily, the preceding vehicle 101 passes the parked vehicles 105, 106 by a steering operation without performing deceleration. In this case, the own vehicle 100 also passes the parked vehicles 105, 106 without performing deceleration.

On the other hand, in a case where when the own vehicle 100 approaches the parked vehicles 105, 106, it cannot avoid them by the steering operation due to approach of an opposing vehicle and so on, and further where the parked vehicle 105 exists in front, an emergency brake operates to stop the own vehicle as shown in the thick line. In such a case, it is not a follow-up state to the preceding vehicle 101, but the brake operation is performed by assuming the parked vehicle 105 as the nearest forward obstacle.

In a case where a vehicle existing ahead of the own vehicle 100 is recognized only by a millimeter radar (for example, the above Patent Document 1), the preceding vehicles 102, 103 stopping at the forward intersection 201 in FIG. 2 have the same vehicle position and speed as those of the parked vehicles 105, 106 other than the intersection, so that it cannot be discriminated whether they are the stopped vehicles or parked vehicles. Thus, in the embodiment 1 of the invention, only in a case where an intersection exists ahead of the own vehicle 100, the stopped vehicle is determined as the stopped vehicle at the intersection (for example, the preceding vehicles 102, 103 in FIG. 2), not the parked vehicle (for example, the parked vehicles 105, 106 in FIG. 3), and predicts a prediction stop position of the own vehicle and determines whether it is switched to the intersection deceleration mode or not.

Next, with reference to FIG. 4, a predicting method of the prediction stop position by the vehicle stop position prediction unit 13 of the intersection processing unit 11 will be described.

Figure 4:
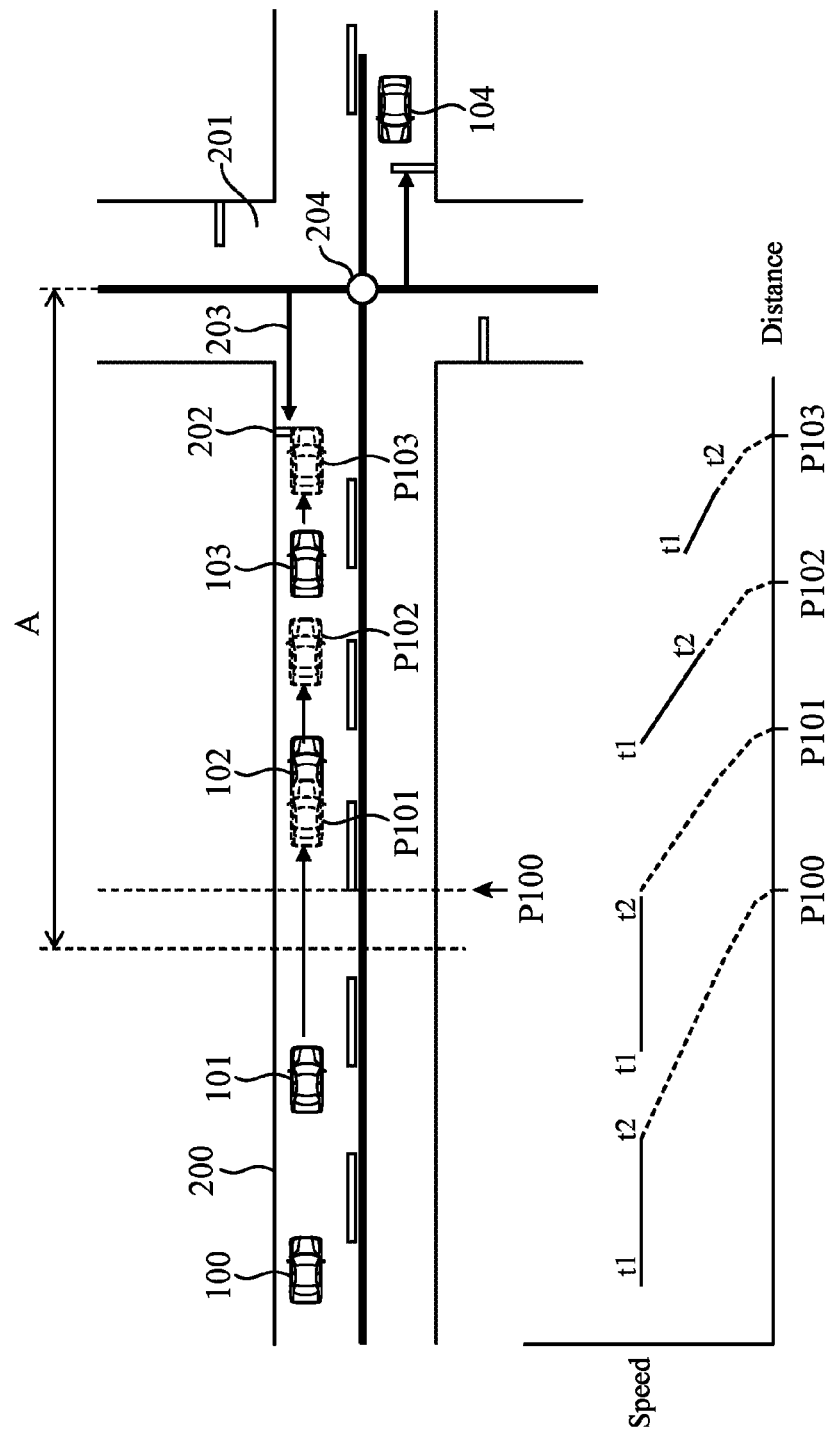
FIG. 4 is a diagram illustrating a vehicle stop position prediction method of the travel control device according to the embodiment 1.

When a current time is given as t1, the positions of the own vehicle 100, preceding vehicles 101 to 103, and an opposing vehicle 104 at the time t1 are shown on a road map at an upper part of FIG. 4. The relations between speeds and distances to the intersection 201 of the own vehicle 100 and preceding vehicles 101 to 103 at that time are shown in a graph at a lower part of FIG. 4. The intersection processing unit 11 acquires periodically the information of the speed and position (distance) of each vehicle through the forward vehicle detection device 1, and changes of speed and distance of each vehicle from a time t1 to a time t2 being after a fixed period of time from the time t1 is shown by a solid line in the graph.

Since the preceding vehicle 102 and preceding vehicle 103 start decelerating for stopping at the intersection 201, the vehicle stop position prediction unit 13 finds decelerations from the speed at the time t1 and the speed at the time t2. Also, the vehicle stop position prediction unit 13 predicts times the speeds will come to zero when the preceding vehicle 102 and preceding vehicle 103 keep decelerating at those decelerations, and the corresponding stop positions (prediction stop position P102 of the preceding vehicle 102 and prediction stop position P103 of preceding vehicle 103), respectively.

Though the preceding vehicle 101 does not start decelerating between the time t1 and time t2 yet, when the prediction stop position P102 of the preceding vehicle 102 is predicted, it needs to stop behind that position. Therefore, the vehicle stop position prediction unit 13 predicts that the preceding vehicle 101 will stop at a fixed inter-vehicle distance behind the prediction stop position P102 of the preceding vehicle 102 (prediction stop position P101 of the preceding vehicle 101).

Since the own vehicle 100 needs to stop behind the prediction stop position P101 of the preceding vehicle 101, the vehicle stop position prediction unit 13 predicts that the own vehicle 100 will stop at a fixed inter-vehicle distance behind the prediction stop position P101 (prediction stop position P100 of the own vehicle 100).

Namely, the vehicle stop position prediction unit 13 predicts the stop positions by the number of the preceding vehicles 101 to 103 existing from the own vehicle 100 to the forward intersection 201 in an order closer to the forward intersection 201, and finally predicts the stop position of the own vehicle 100.

Note that when the preceding vehicles 102, 103 has already been stopped as in FIG. 2 shown previously, the prediction stop positions P102, P103 become the same as actual stop positions.

As described above, when the preceding vehicle starts decelerating, the stop position can be predicted even if the preceding vehicle is not stopping.

Next, an estimation method of a stop position estimation range by the intersection stopped vehicle determining unit 12 of the intersection processing unit 11 will be described with reference to FIG. 4 to FIG. 7.

The operation of the vehicle stop position prediction unit 13 shown in FIG. 4 is performed to the vehicle approaching to the intersection 201. When a range regarded as the vehicle approaching to the intersection 201 is defined as a stop position estimation range A, a range at a fixed distance from the center of the intersection 201 is targeted. Since the size of the intersection 201 is different depending on the location, when the distance 203 from the intersection 201 to a stop line 202 is longer, the stop position estimation range A needs to be corrected accordingly.

In addition, when positional information of the stop line 202 is included in the map data held by the car navigation device and so on, a range at a fixed distance from the stop line 202 is defined as the stop position estimation range A, and a stop position of a vehicle that performs stopping or decelerating in the stop position estimation range A can be predicted. However, in a usual navigation device, the position of the stop line 202 is not recorded truly, and thus the position of the stop line 202 needs to be estimated.

In the map data held in the navigation device and so on, information on a distance and a direction from a point of an intersection or curve on a road to a central part of the next intersection, called link, and information on a point intersected by a plurality of roads (intersection center 204 shown in FIG. 4), called node, are recorded.

As shown in FIG. 4, since the distance 203 from the intersection center 204 to the stop line 202 can be estimated from intersection attribute information such as a road width of intersected roads to some extent, when the information on the road width of the intersected roads is included in the intersection attribute information of the map data, the intersection stopped vehicle determining unit 12 can estimate the distance 203 to the stop line 202 as "half of the road width+a fixed distance."

On the other hand, when there is no information on the road width in the intersection attribute information, the road width may be estimated from the number of road lanes, a road type (for instance, a general community road, or a main road such as national route), and a variety of attribute information included in the map data.

In addition, the forward vehicle detection device 1 can detect a stop of an opposing vehicle 104, the intersection stopped vehicle determining unit 12, assuming that the shape of the intersection 201 is a linear symmetry on the basis of the intersection center 204, may use the distance from a line Passing the intersection center 204 to the stop position of the opposing vehicle 104 as the distance 203 from the line passing the intersection center 204 to the stop line 202.

Next, with reference to FIG. 5 to FIG. 7, a correction method of the stop position estimation range A, a determination method of a parked vehicle and a signal stopped vehicle performed by the intersection stopped vehicle determining unit 12 will be described.

Figure 5:
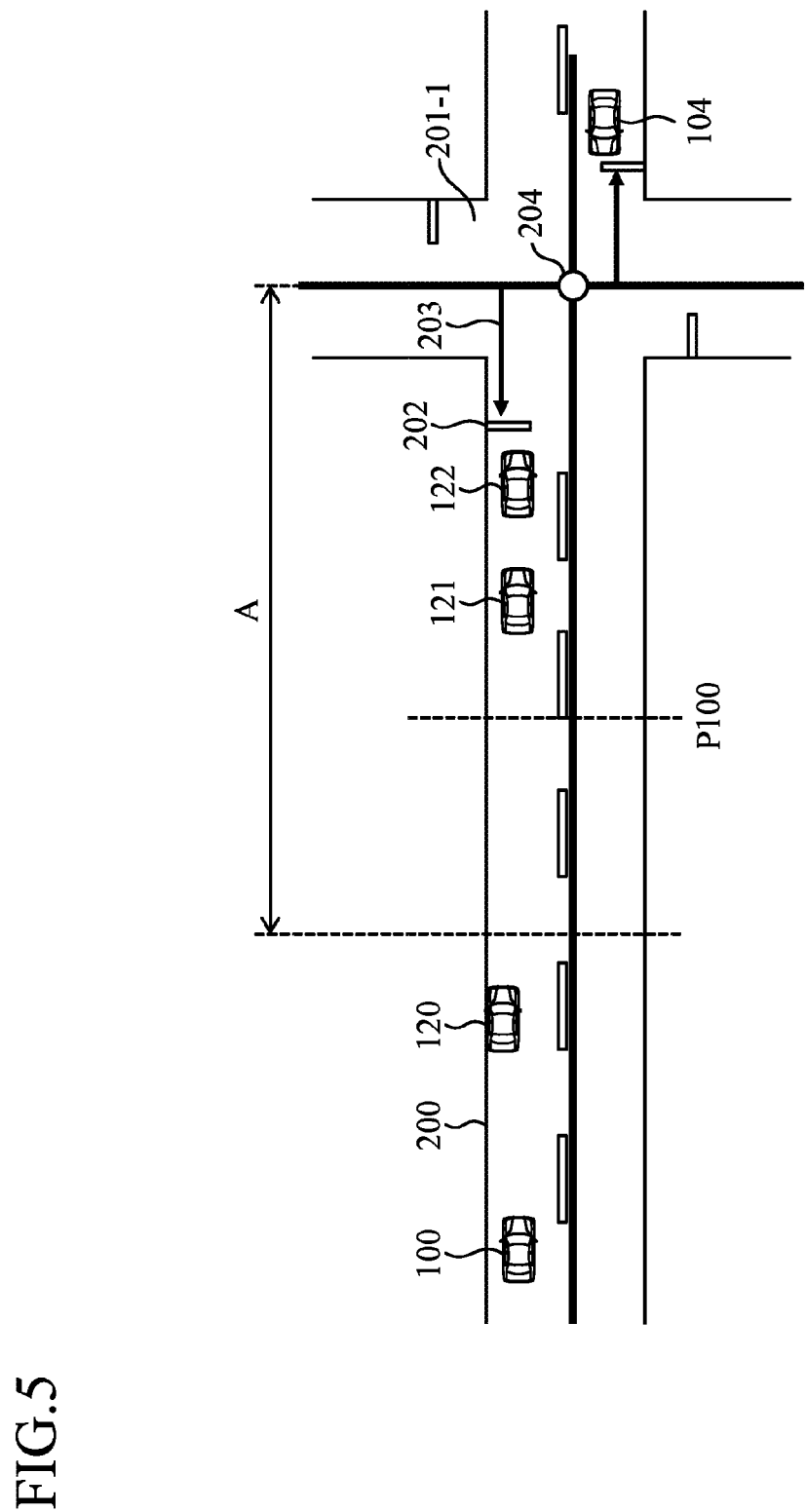
FIG. 5 is a diagram showing a change of a stop position estimation range to a size of the intersection of the travel control device according to the embodiment 1, and an example of a small intersection.
Figure 6:
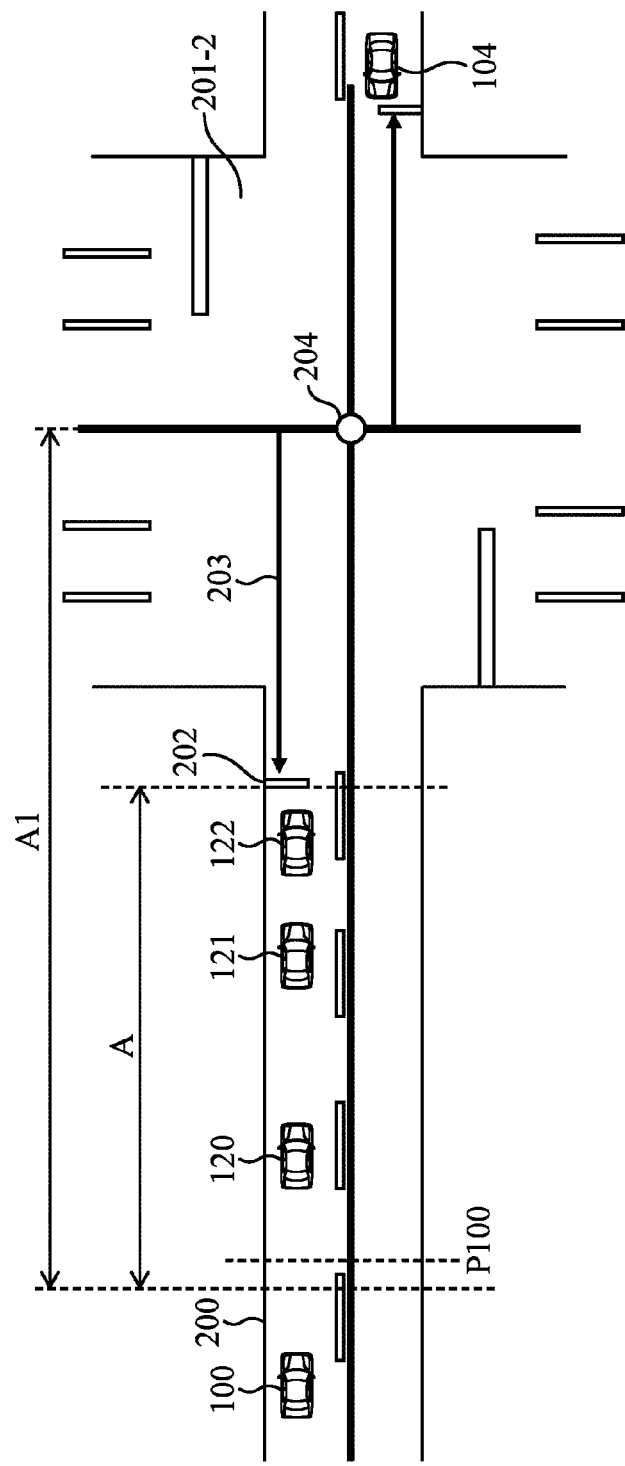
FIG. 6 is a diagram showing the change of the stop position estimation range to the size of the intersection of the travel control device according to the embodiment 1, and an example of a large intersection.

FIG. 5 is an example of a small forward intersection 201-1, and FIG. 6 is an example of a large forward intersection 201-2. In these examples, it is assumed that the number of lanes are recorded only for large intersections in advance in the map data held in the navigation device.

At the small intersection 201-1 shown in FIG. 5, the intersection stopped vehicle determining unit 12 estimates the distance 203 from the intersection center 204 to the stop line 202 based on the intersection attribute information of the map data, and so on.

Since the distance 203 from the intersection center 204 to the stop line 202 is short at the small intersection 201-1 shown in FIG. 5, the intersection stopped vehicle determining unit 12 adds a fixed distance (for example, 40 m on the assumption of stops of the order of one to four ordinary-sized vehicles) to an estimated distance (for example, 10 m) to thus determine the stop position estimation range A to be 50 m. Then, the vehicle stop position prediction unit 13 may determine vehicles 121, 122 existing in the stop position estimation range A (=50 m) as the signal stopped vehicles stopping because of the red signal and so on at the forward intersection 201-1, and determine a vehicle 120 deviating from the stop position estimation range A as the parked vehicle.

In addition, the vehicle stop position prediction unit 13 may predict the prediction stop position P100 of the own vehicle 100 within the stop position estimation range A=50 m from the forward intersection 201-1.

Note that, 40 in shown as the fixed distance is merely an example, and it may be set adjustable as a parameter, or a distance varying according to a usual traffic volume and so on may be set in advance on the map data.

At the large intersection 201-2 shown in FIG. 6, there are three lanes on each side in the number of lanes, and therefore, the stop line 202 is away from the intersection center 204. In this case, the intersection stopped vehicle determining unit 12 corrects the distance 203 to the stop line 202 to be wider by the number of lanes, and the stop position estimation range A is also corrected to be wider to a stop position estimation range A1 by that correction. As a result, the vehicle 120 determined as a parked vehicle at the small forward intersection 201-1 in FIG. 5 is determined as an intersection stopped vehicle at the large intersection 201-2. The vehicles 121, 122 are also determined as the intersection stopped vehicles.

Figure 7:
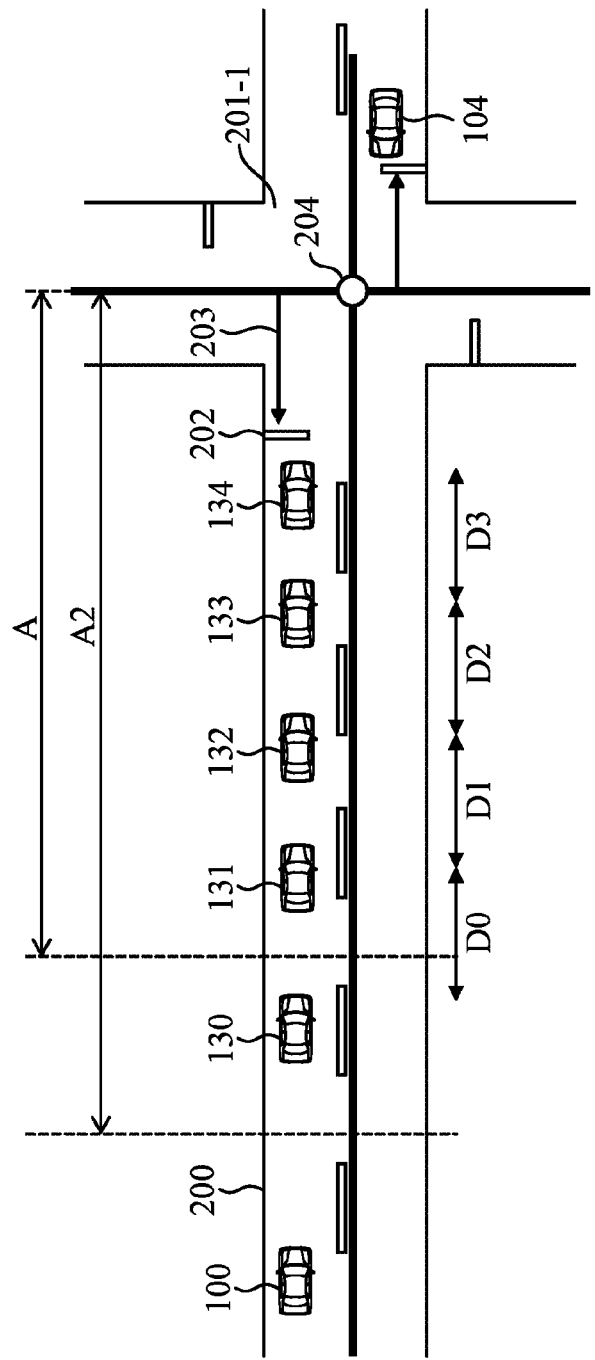
FIG. 7 is a diagram showing the change of the stop position estimation range to the size of the intersection of the travel control device according to the embodiment 1, and an example in congestion at the small intersection.

FIG. 7 shows an example in congestion at the small forward intersection 201-1. Even at the small forward intersection 201-1, when a light congestion occurs due to the signal, there is a possibility that a number of vehicles 130 to 134 will stop consecutively. When the forward vehicle detection device 1 detects that a number of vehicles are stopping at a constant distance interval as mentioned above, the intersection stopped vehicle determining unit 12 corrects the standard stop position estimation range A estimated by the method of FIG. 5 to be wider to an in-congestion stop position estimation range A2. In such a way, the vehicle 130 determined as a parked vehicle according to the standard stop position estimation range A is determined as an intersection stopped vehicle according to the in-congestion standard stop position estimation range.

Specifically, when each of intervals DO to D3 between the vehicles 130 to 134 is within a range of a predetermined interval (for example, 10±7 m) from detection results of the forward vehicle detection device 1, and the vehicles 130 to 134 can be considered to be stopped consecutively, the intersection stopped vehicle determining unit 12 performs processing of correcting the stop position estimation range A and the like. In addition, a vehicle length becomes longer in a large-sized vehicle, and the millimeter radar outputs a plurality of detection points by responding to shapes of a cargo bed part, a trailer part, a structure under the vehicle, and so on; thus, when the vehicles 130 to 134 can be determined as large-sized vehicles from these detection points, the correction distance of the stop position estimation range A may be given wider accordingly. Further, when vehicle types of the vehicles 130 to 134 are available based on inter-vehicle communication or the like, the correction distance of the stop position estimation range A may be adjusted based on the vehicle types.

Next, the operation of the travel control device 10 will be described in more detail with reference to flow charts of FIG. 8 and FIG. 9. Note that in the description, a processing method of the intersection processing unit 11 (FIG. 8) and a processing method of the travel mode switching unit 14 (FIG. 9) will be described separately. However, the travel speed control unit 15 performs the same operation as that of control by a general auto cruise device, and thus, description thereof will be omitted.

First, the processing operation of the intersection processing unit 11 will be described with reference to FIG. 8

(1) Determination of Intersection Stopped Vehicle and Prediction Processing of Vehicle Stop Position In the prediction processing of the vehicle stop position, it will be described on the assumption of a situation that the own vehicle mounted with the travel control device 10 is approaching the intersection.

The intersection stopped vehicle determining unit 12 obtains the distance from the position of the own vehicle to the nearest forward intersection from among the information obtained from the forward intersection distance acquisition device 2 (step ST1). In addition, the intersection stopped vehicle determining unit 12 estimates the position of a stop line on the basis of information for estimating the position of the stop line, such as information of the stop line and the width of intersected roads of the forward intersection, included in the information obtained from the forward intersection distance acquisition device 2. It sets the position of the stop line in a size of a standard intersection when there is particularly no information for estimating the position of the stop line in the information obtained from the forward intersection distance acquisition device 2 (step ST2). Subsequently, the intersection stopped vehicle determining unit 12 sets a range from the intersection center of the forward intersection to a fixed distance therefrom as a stop position estimation range (for example, the stop position estimation range A in FIG. 4), and corrects the stop position estimation range according to the stop line position estimated at step ST2 (step ST3). The stop position estimation range is used for determining to what range from the intersection center the stopped vehicle is recognized as the stopped vehicle stopping temporarily at the forward intersection, and a correction of expanding the stop position estimation range is performed when a distance from the intersection center to the stop line is large.

Subsequently, the vehicle stop position prediction unit 13 acquires a position and a speed of the forward vehicle existing ahead of the own vehicle from among the information obtained from the forward vehicle detection device 1. Since the millimeter radar is assumed as the forward vehicle detection device 1 in the embodiment 1, the position and speed of the forward vehicle can be acquired at the same time, while when a detection device that detects only the position is employed, processing that obtains the speed from a change of the position is also performed in the vehicle stop position prediction unit 13 at the same time (step ST4).

In a case where there is a decelerating vehicle in forward vehicles, the vehicle stop position prediction unit 13 predicts a stop position on the assumption that such deceleration state continues (step ST5), and determines whether or not the predicted stop position and the stop position of the already stopped vehicle exist in the stop position estimation range (step ST6).

When the stopped vehicle exists in the stop position estimation range (YES at step ST6), the vehicle stop position prediction unit 13 acquires the number of vehicles existing between the own vehicle and the stopped vehicle (including an estimation stopped vehicle) from the forward vehicle detection device 1 (step ST7). Subsequently, the vehicle stop position prediction unit 13 predicts the stop position of the own vehicle (for example, the prediction stop position P100 in FIG. 4) by adding a distance corresponding to the number of vehicles obtained at step ST7 (for example, 10 m in total of a vehicle length of 5 m and an inter-vehicle distance of 5 m for one vehicle) to the behind of the stopped vehicle located at the nearest position from the own vehicle obtained at step ST5 (including the estimation stopped vehicle) (step ST8).

When no stopped vehicle exists in the stop position estimation range (NO at step ST6), the vehicle stop position prediction unit 13 clears the prediction stop position of the own vehicle (step ST9).

Thereafter, the flow returns to the processing at step ST1, and repeats the aforementioned processing.

Subsequently, the processing operation of the travel mode switching unit 14 will be described with reference to FIG. 9.

(2) Switching of Travel Mode and Calculation Processing of Target Speed

In a general auto cruise device, by pushing a speed setting switch for auto cruise and so on during traveling, a current vehicle speed is recorded as a travel speed set value. For another travel speed setting example, for instance, a regulation speed of a road included in the map data of the car navigation device, a recognition result of a speed sign obtained by a vehicle-mounted camera, or the like may be set as the travel speed set value.

The travel speed setting device 3 performs the aforementioned travel speed setting operation, and memorizes the travel speed set value.

The travel mode switching unit 14 acquires the travel speed set value memorized by the travel speed setting device 3 (step ST10). Subsequently, the travel mode switching unit 14 determines whether or not the nearest forward vehicle is decelerating or approaching the own vehicle on the basis of the information obtained from the forward vehicle detection device 1 (step ST11).

When the nearest forward vehicle is decelerating earlier than the own vehicle, and approaching (YES at step ST11), the forward vehicle follow-up travel mode that performs follow-up traveling to the nearest forward vehicle is set (step ST20), and the speed of the nearest forward vehicle is set to the target speed (step ST21).

When the nearest forward vehicle does not start decelerating (NO at step ST11), the travel mode switching unit 14 determines whether or not the prediction stop position of the own vehicle (for example, the prediction stop position P100 in FIG. 4) is set by the vehicle stop position prediction unit 13 (step ST12). When the prediction stop position of the own vehicle is set (YES at step ST12), the travel mode switching unit 14 determines whether or not the current travel mode is the intersection deceleration mode (step ST13).

When the current travel mode is not the intersection deceleration mode (NO at step ST13), the intersection deceleration mode is set (step ST14), and a deceleration target curve directed to the prediction stop position of the own vehicle is calculated and set so that fuel cut can be performed owing to deceleration by engine brake, for example, as a driving for improving fuel economy (step ST15).

Since an optimum deceleration target curve varies depending on a type of power train of the vehicle, the travel mode switching unit 14 makes a different setting based on size of engine brake for gasoline vehicle or diesel vehicle, size of regenerative brake for hybrid vehicle or electric vehicle, or the like. For example, deceleration by the engine brake is set smaller (stop at a long distance), and deceleration by the hybrid vehicle and electric vehicle capable of recovering energy by regeneration is set larger (stop at a short distance). When a regeneration amount needs to be changed according to a situation, it may be schemed that the deceleration can be set dynamically.

When it has been already set to the intersection deceleration mode (YES at step ST13), the travel mode switching unit 14 sets the target speed so that the deceleration along the deceleration target curve set at step ST15 will be achieved (step ST16).

When the prediction stop position of the own vehicle has not been set at step ST12 (NO at step ST12), the travel mode switching unit 14 determines whether or not the speed of the nearest forward vehicle is larger than the travel speed set value (step ST17), and when the speed of the nearest forward vehicle is larger (YES at step ST17), the set speed travel mode is set (step ST18), and the travel speed set value is set to the target speed (step ST19).

When the speed of the nearest forward vehicle is smaller (NO at step ST17), the travel mode switching unit 14 performs setting to the forward vehicle follow-up travel mode (step ST20), and sets the speed of the nearest forward vehicle to the target speed (step ST21).

Thereafter, the flow returns to the step ST10, and the aforementioned processing is repeated.

The travel speed control unit 15 controls the brake control device 5 and power train control device 6 so that the travel is performed at the target speed set by the travel mode switching unit 14.

Figure 8:
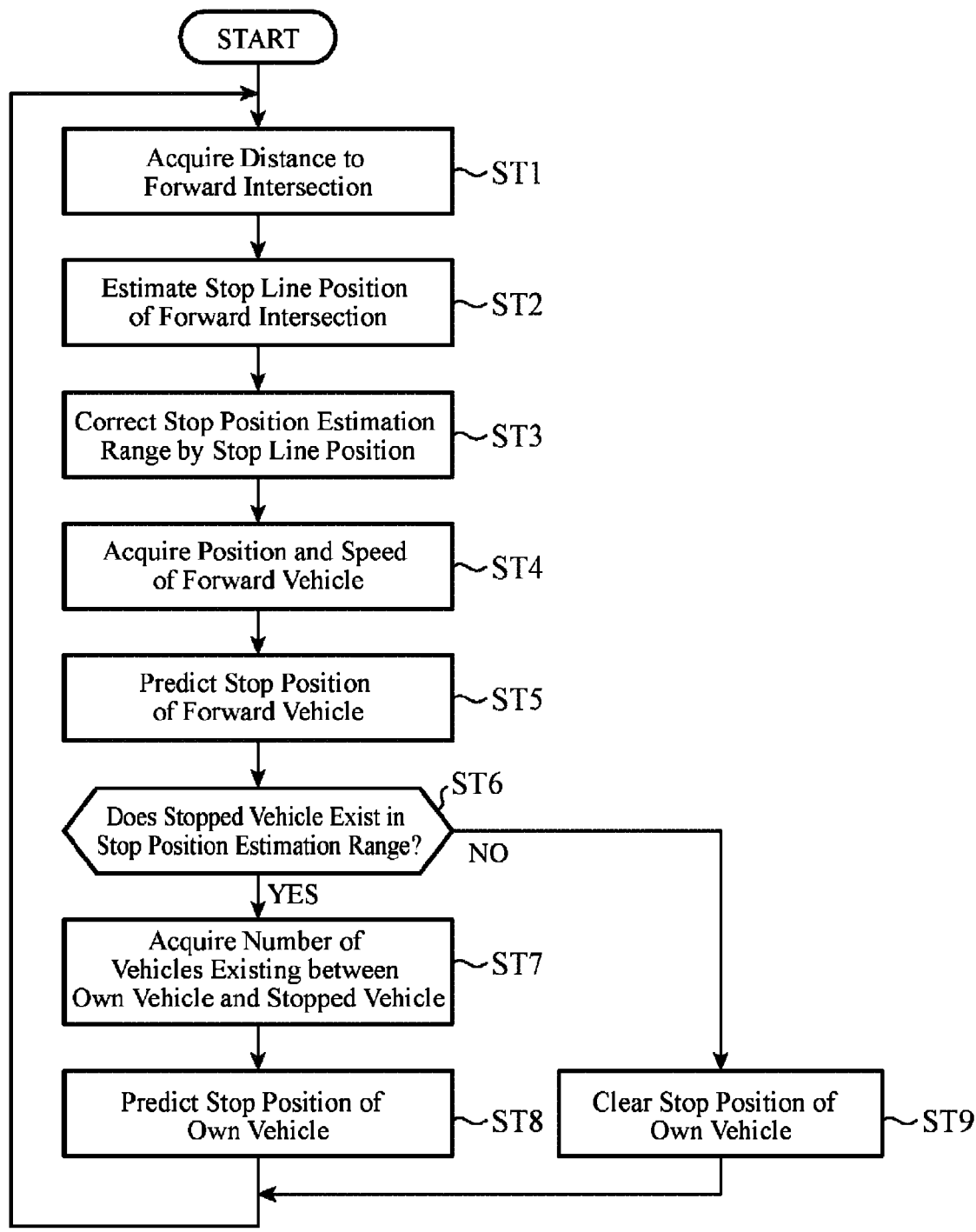
FIG. 8 is a flow chart showing the operation of an intersection processing unit of the travel control device according to the embodiment 1.
Figure 9:
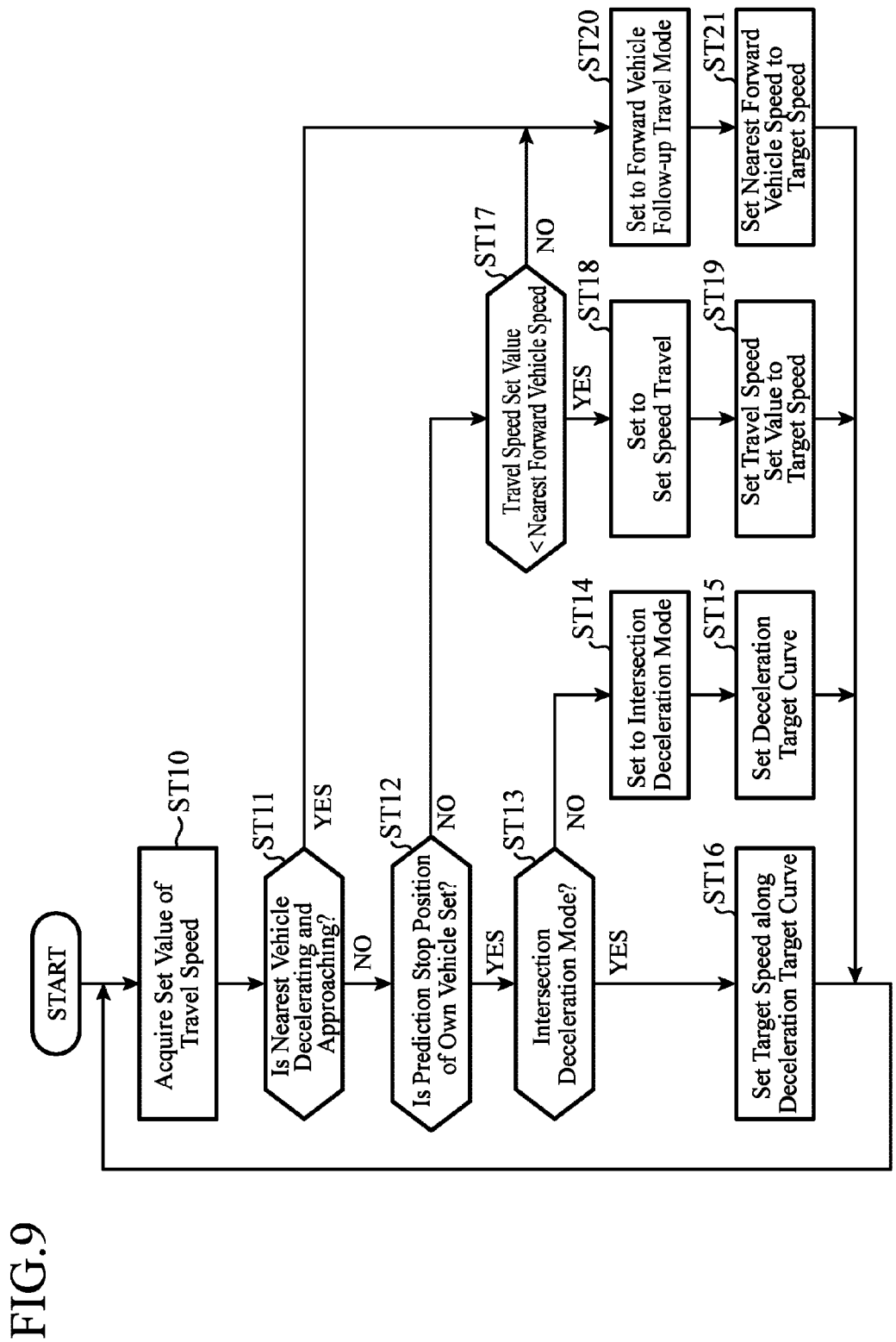
FIG. 9 is a flow chart showing the operation of a travel mode switching unit of the travel control device according to the embodiment 1.

In the processing operations of FIG. 8 and FIG. 9, the deceleration is performed at the intersection deceleration mode in a state where there exist stopped vehicles (including estimation stopped vehicles) within the stop position estimation range; however, when the signal of the intersection is changed from red to green, and the first vehicle (the stopped vehicle nearest the forward intersection) starts, and the second and after stopped vehicles start successively, which eliminates the necessity to stop at the prediction stop position of the own vehicle. For this reason, in a case where the first vehicle starts, even if another stopped vehicle (including estimation stopped vehicles) exists, the travel mode switching unit 14 may be adapted to release the intersection deceleration mode and shifts promptly it to a normal mode (for example, the forward vehicle follow-up travel mode or the set speed travel mode), whereby occurrence of an unnecessary deceleration can be prevented.

In addition, when there are a large number of stopped vehicles at the forward intersection, even if the first vehicle starts, it takes time to start the subsequent vehicles; thus, when the intersection deceleration mode is released after only the start of the first vehicle, there is a possibility that it is released at the time the deceleration at the intersection deceleration mode is still necessary (for example, the subsequent vehicles do not pass the forward intersection yet).

In consideration of the above possibility, in addition to the condition of "when the first vehicle starts," a mode release standby time according to the number of stopped vehicles is provided; thus, it may be adapted that the time from the start of the first vehicle to the release of the intersection deceleration mode is delayed in the travel mode switching unit 14, so that a smooth driving is carried out.

Specifically, at the time the vehicle stop position prediction unit 13 makes the determination of step ST6 in FIG. 8, when stopped vehicles exist in the stop position estimation range, and the first vehicle of the stopped vehicles starts, it proceeds to the processing of step 319, and the prediction stop position of the own vehicle is cleared (after the mode release standby time goes by).

In this manner, the travel mode shifts to a travel mode other than the intersection deceleration mode through the determination at step ST12 in FIG. 9 (in other words, the intersection deceleration mode is released).

Additionally, in a vehicle mounted with an engine having an idling stop function, when the own vehicle proceeds to deceleration and stop in the case of the shifting to the intersection deceleration mode, it is desirable to prevent occurrence of engine stall. Specifically, an instruction is made from the travel speed control unit 15 to the power train control device 6 in shifting to the intersection deceleration mode so that the upper speed limit for entering an idling stop is increased to a set speed in which fuel cut in the deceleration recovers (for example, 20 km/h).

In addition, when the intersection deceleration mode is released, there is a high possibility to be shifted to acceleration; thus, by prohibiting the idling stop or decreasing the upper speed limit for entering the idling stop (for example, 5 km/h), fuel can be saved as much as possible while deterioration of travel feeling due to delay of engine start at reacceleration is prevented.

Figure 10:
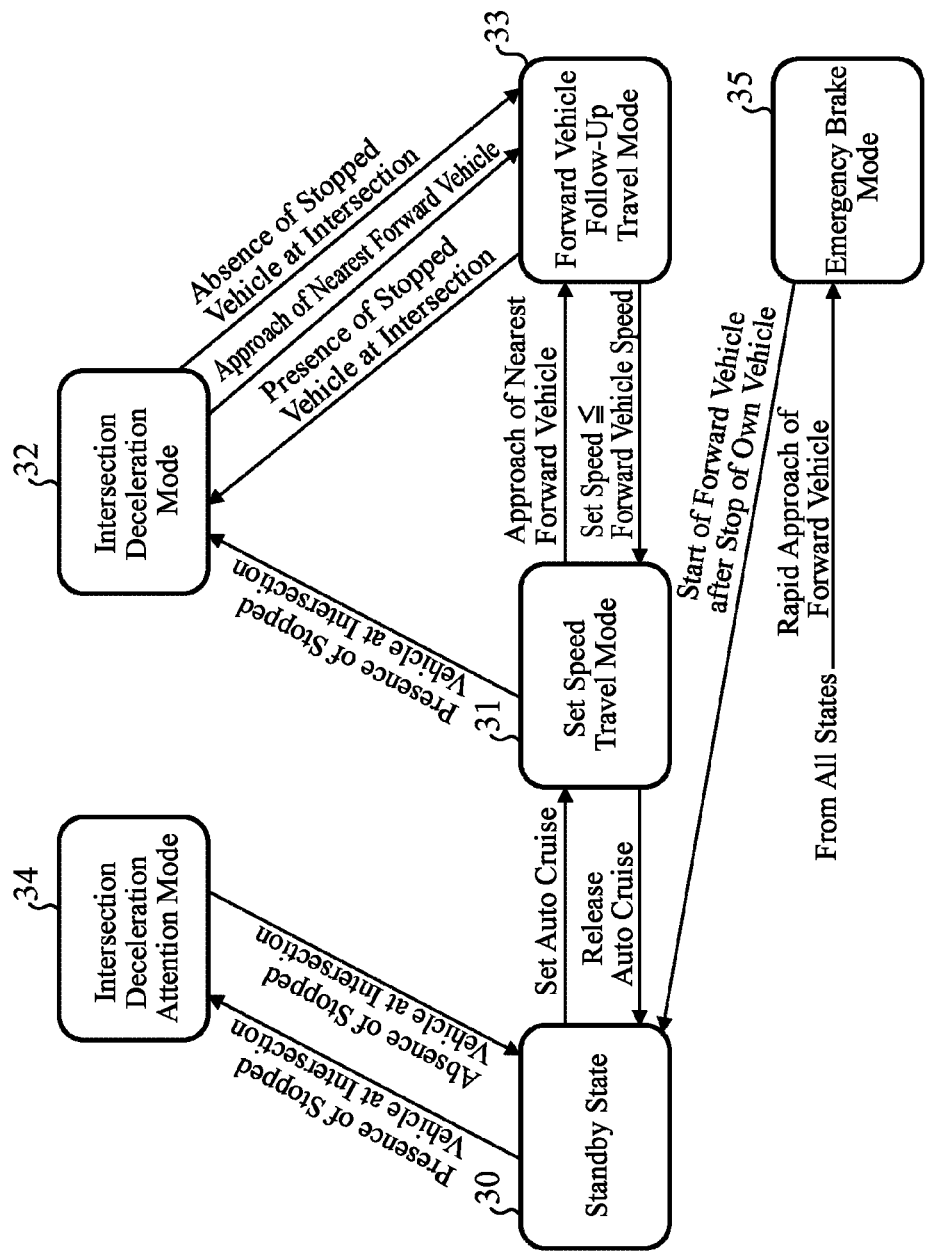
FIG. 10 is a state transition diagram of the travel control device according to the embodiment 1.

Here, a state transition diagram of the travel control device 10 is shown in FIG. 10. The operation of the notification device 7 will also be described in combination with an explanation of the state transition diagram.

The travel control device 10 is put in a standby state 30 when power is turned on.

Even in the standby state 30, for example, information on the forward vehicle detected by the forward vehicle detection device 1 is inputted, and the operation of FIG. 8 and so on are carried out.

When in the standby state 30 the driver presses a speed setting switch for auto cruise or the like, the travel speed setting device 3 detects the pressing of the switch, and the vehicle speed at this time is memorized as the travel speed set value. Then, when the travel mode switching unit 14 sets a set speed travel mode 31 thereto, the travel speed set value is set to the target speed at the same time. The travel speed control unit 15 controls the vehicle so as to travel at the target speed. When the auto cruise is released by the driver, the travel speed setting device 3 detects the auto cruise release and reports the detection result to the travel mode switching unit 14, and returns it to the standby state 30. Release conditions of the auto cruise by the driver include generally pressing a release switch, stamping a brake, operating a gear, and the like.

When the vehicle approaches the intersection during the set speed travel mode 31, and a stopped vehicle (including an estimation stopped vehicle) exists at the intersection, the travel mode switching unit 14 switches it to an intersection deceleration mode 32. In the intersection deceleration mode 32, the travel mode switching unit 14 sets the target speed and make the travel speed control unit control the vehicle so that a deceleration driving that saves fuel consumption by targeting the prediction stop position of the own vehicle will be carried out.

At this time, even if the forward vehicle nearest the own vehicle does not start decelerating, there are some cases where the deceleration is started automatically at the shifting to the intersection deceleration mode 32; thus, in order to prevent the driver from causing confusion due to a sudden automatic deceleration and from misunderstanding it as a system failure, an instruction is made from the intersection processing unit 11 to the notification device 7 to notify the driver of the entering to the intersection deceleration mode. The notification device 7 responds to the instruction of the intersection processing unit 11, and outputs a display, or a voice or an alerting sound (buzzer etc.) to notify the driver to that effect.

When no stopped vehicle exists at the intersection because of the start of stopped vehicles, or when the own vehicle approaches the nearest forward vehicle, the travel mode switching unit 14 switches from the intersection deceleration mode 32 to the forward vehicle follow-up travel mode 33.

In the forward vehicle follow-up travel mode 33, the travel mode switching unit 14 sets the speed of the forward vehicle to the target speed when the speed of the forward vehicle is the set speed of the own vehicle or less, and the travel speed control unit 15 performs travel control while keeping an appropriate inter-vehicle distance.

When the vehicle approaches an intersection during the forward vehicle follow-up travel mode 33, and a stopped vehicle (including an estimation stopped vehicle) exists at the intersection, the travel mode switching unit 14 performs switching to the intersection deceleration mode 32. Even if the forward vehicle does not start decelerating, the travel mode switching unit 14 sets the target speed so that the deceleration driving that saves fuel consumption using the prediction stop position of the own vehicle as the target will be carried out. In addition, an instruction is made from the intersection processing unit 11 to the notification device 7, and the driver is notified of the entering to the intersection deceleration mode.

However, when the nearest forward vehicle decelerates more than the deceleration of the own vehicle during deceleration and approaches the own vehicle, it is quickly switched to the forward vehicle follow-up travel mode 33.

On the other hand, when the vehicle approaches the intersection during the standby state 30, and a stopped vehicle (including an estimation stopped vehicle) exists at the intersection, it is reported from the intersection processing unit 11 to the travel mode switching unit 14, and the travel mode switching unit 14 performs switching to an intersection deceleration attention mode 34 that notifies the driver of intersection deceleration attention. In this state, the travel control (auto cruise) by the travel speed control unit 15 is not performed, so that a traveling by driver's accelerating and braking operations is to be executed. When the stopped vehicle at the intersection starts, and the stopped vehicle becomes absent, it returns to the standby state 30.

In addition, even when the auto cruse is not operated, when it is necessary for the vehicle to stop at the intersection, in other words, when the prediction stop position is set by the vehicle stop position prediction unit 13, an instruction is preferably made from the intersection processing unit 11 to the notification device 7 to notify the driver to that effect. In this manner, even when the driver of the own vehicle cannot see a red signal due to a forward track and so on, necessity to stop at the intersection can be notified; thus, it becomes possible for the driver to cope with even a rapid deceleration of the track at the intersection.

Though transition lines are not depicted to avoid complexity, in a state where a collision occurs immediately unless an emergency brake is applied thereto due to a rapid approach of the forward vehicle, the travel mode switching unit 14 switches all states of the standby state 30, set speed travel mode 31, intersection deceleration mode 32, forward vehicle follow-up travel mode 33, and intersection deceleration attention mode 34 to an emergency brake mode 35. The travel speed control unit 15 that receives from the travel mode switching unit 14 a report of the shift to the intersection deceleration attention mode 34 performs an emergency braking of high deceleration by controlling the brake control device 5 to thereby avoid a collision with the forward vehicle.

The travel mode switching unit 14 performs switching to the standby state 30 when the own vehicle is stopped by the emergency brake, and also the forward vehicle or obstacle is gone.

As described above, according to the embodiment 1, the travel control device 10 includes the travel mode switching unit 14 and travel speed control unit 15 that achieve the forward vehicle follow-up traveling function that performs follow-up traveling to the nearest forward vehicle of one or more forward vehicles existing ahead of the own vehicle as a followed vehicle, and is configured to further include: the intersection stopped vehicle determining unit 12 that determines whether or not the forward vehicle is the stopped vehicle that is stopped at the intersection, based on the distance information from the own vehicle to each forward vehicle acquired by the forward vehicle detection device 1, and the distance information to the intersection existing ahead of the own vehicle acquired by the forward intersection distance acquisition device 2; and the vehicle stop position prediction unit 13 that predicts the stop position of the own vehicle at the intersection based on the distance information of the stopped vehicle, when the forward vehicle is determined as the stopped vehicle by the intersection stopped vehicle determining unit 12. Therefore, even in a state where the nearest forward vehicle is not decelerated or stopped at the intersection without any infrastructure equipment installed, the travel control device 10 can be provided that enables the start of the deceleration of the own vehicle when the vehicle ahead of the nearest forward vehicle is stopped.

In addition, according to the embodiment 1, the vehicle stop position prediction unit 13 is configured to predict the stop position at an intersection by obtaining a change of the travel speed of each forward vehicle on the basis of a change in the distance information from the own vehicle to each forward vehicle, and determine whether or not the forward vehicle is the stopped vehicle to be stopped at the intersection based on the predicted stop position, and also predict the stop position of the own vehicle at the intersection. Therefore, it can be determined whether or not the forward vehicle during traveling that proceeds to the intersection is also the stopped vehicle, and consequently can start the deceleration driving by predicting the stop position of the own vehicle.

In addition, according to the embodiment 1, the intersection stopped vehicle determining unit 12 is configured to estimate the distance from the center of the intersection to the stop line based on the attribute information of the intersection acquired by the forward intersection distance acquisition device 2, set the stop position estimation range by adding a fixed distance to the estimated distance, to thereby determine as the stopped vehicle the forward vehicle that is stopped or the forward vehicle estimated to be stopped within the stop position estimation range. Therefore, the stop position estimation range can be set even if the information of the stop line is not included in the map data of the navigation device and so on, and whether the forward vehicle is the stopped vehicle or not can be determined based on the stop position estimation range.

In addition, according to the embodiment 1, the intersection stopped vehicle determining unit 12 is configured to expand the stop position estimation range when it is determined that the forward vehicles are stopped successively based on the distance information from the own vehicle to each forward vehicle and the distance information to the intersection. Therefore, the stopped vehicle and parked vehicle can be determined correctly even though a congestion occurs at the intersection.

In addition, according to the embodiment 1, the travel control device 10 is configured to includes the travel mode switching unit 14 that executes to switch between the forward vehicle follow-up travel mode that travels using the speed of the followed vehicle as a target, and the intersection deceleration mode that performs deceleration using the stop position predicted by the vehicle stop position prediction unit 13 as the target even if the followed vehicle does not start decelerating yet. Even in a state where the nearest forward vehicle is not decelerated or stopped at the intersection, the deceleration of the own vehicle is started when the vehicle ahead of the nearest one is stopped, to thereby perform the driving for improving fuel economy with good comfort.

In addition, according to the embodiment 1, the travel mode switching unit 14 is configured to release the intersection deceleration mode when it is determined that the forward vehicle determined as the stopped vehicle by the intersection stopped vehicle determining unit 12 starts proceeding. Therefore, an unnecessary deceleration can be prevented.

In addition, according to the embodiment 1, the travel mode switching unit 14 is configured to delay the time that releases the intersection deceleration mode based on the number of stopped vehicles when it is determined that the forward vehicle determined as the stopped vehicle by the intersection stopped vehicle determining unit 12 starts proceeding. Therefore, it can be prevented that the deceleration at the intersection deceleration mode is released when necessary, to thereby perform a smooth travel control.

In addition, according to the embodiment 1, the travel mode switching unit 14 is configured to have the intersection deceleration mode that decelerates at the deceleration that differs for each type of the driving source of the own vehicle, and executes to switch the intersection deceleration mode according to the type of the driving source. Therefore, a more appropriate driving for improving fuel economy can be carried out.

In addition, according to the embodiment 1, the travel control device 10 is configured to include the travel speed control unit 15 that controls the upper speed limit at which the own vehicle enters the idling stop, wherein when the type of the driving source of the own vehicle is the combustion engine, the travel speed control unit 15 sets the upper speed limit at which the idling stop starts during execution of the intersection deceleration mode, higher as compared to the case that is not the intersection deceleration mode. Therefore, an improvement of fuel economy due to active engine stop of the intersection deceleration mode is possible. On the other hand, since a state that is not the intersection deceleration mode, in other words, a state having a possibility of acceleration (for example, when acceleration is necessary at a green signal) comes to hardly stop the engine, an acceleration delay due to an incident that the engine is stopped in a state which is not the intersection deceleration mode, and that the engine is started again during reacceleration can be prevented.

In addition, according to the embodiment 1, when the travel mode switching unit 14 performs switching to the intersection deceleration mode, the intersection stopped vehicle determining unit 12 is configured to notify a driver, through the notification device 7 equipped in the own vehicle, that the intersection deceleration mode is executed. Therefore, when the own vehicle starts decelerating irrespective of no deceleration start of the nearest forward vehicle, it can be prevented that the driver is confused due to a sudden automatic deceleration, or misunderstands it as a system failure.

In addition, according to the embodiment 1, it is configured such that when it is determined that the forward vehicle is the stopped vehicle, the intersection stopped vehicle determining unit 12 notifies the driver that the stop of the own vehicle at the intersection is predicted through the notification device 7 equipped in the own vehicle. Therefore, for example, when the auto cruise is not operated, and when the driver cannot watch a forward red signal, necessity of deceleration and stop can be notified.

In addition, according to the embodiment 1, the travel control device 10 is configured to include the forward vehicle detection device 1 that acquires the distance information from the own vehicle to each forward vehicle using the millimeter radar or inter-vehicle communication. Therefore, the driving for improving fuel economy can be carried out even without the infrastructure to distribute the signal information at the intersection and stopped vehicle information.

Incidentally, it is to be understood that variations of any components of the individual embodiments or removal of any components of the individual embodiments is possible within the scope of the invention.

INDUSTRIAL APPLICABILITY

As described above, according to the travel control device, since it is configured that the stop position of the own vehicle at the intersection is predicted irrespective of presence or absence of the deceleration of the followed vehicle, and that the deceleration driving that saves fuel consumption is carried out using the stop position as a target, it is suitable for use in, for example, a travel control device for supporting the driving for improving fuel consumption.

DESCRIPTION OF REFERENCE NUMERALS AND SIGNS 1 forward vehicle detection device, 2 forward intersection distance acquisition device, 3 travel speed setting device, 4 vehicle information provision device, 5 brake control device, 6 power train control device, 7 notification device, 10 travel control device, 11 intersection processing unit, 12 intersection stopped vehicle determining unit, 13 vehicle stop position prediction unit, 14 travel mode switching unit, 15 travel speed control unit, 30 standby state, 31 set speed travel mode, 32 intersection deceleration mode, 33 forward vehicle follow-up travel mode, 34 intersection deceleration attention mode, 35 emergency brake mode, 100 the own vehicle, 101 to 103 preceding vehicle, 104 opposing vehicle, 105, 106 parked vehicle, 120 to 122 vehicle, 200 road, 201, 201-1, 201-2 forward intersection, 202 stop line, 203 distance to stop line, 204 center of intersection, A, A1 stop position estimation range, A2 in-congestion stop position estimation range, P100 to P103 prediction stop position.

The invention claimed is:

1. A travel control device having a forward vehicle follow-up traveling function that performs follow-up traveling to the nearest forward vehicle of one or more forward vehicles existing ahead of an own vehicle as a followed vehicle, said control device comprising an electronic control unit (ECU) comprising:
    an intersection stopped vehicle determiner that determines whether the forward vehicle is a stopped vehicle that is stopped at an intersection or a parked vehicle that is not stopped at the intersection, based on distance information from the own vehicle to each forward vehicle, and distance information to the intersection existing ahead of the own vehicle; and
    a vehicle stop position predictor that predicts a stop position of the own vehicle at the intersection based on distance information of the stopped vehicle, when the forward vehicle is determined as the stopped vehicle by the intersection stopped vehicle determiner, wherein
    the electronic control unit is configured to decelerate the own vehicle, so as to stop the own vehicle at the stop position, when the forward vehicle is determined as the stopped vehicle the intersection stopped vehicle determiner, and
    the electronic control unit is configured to maneuver the own vehicle, so as to cause the vehicle to pass the forward vehicle, when the forward vehicle is determined as the parked vehicle by the intersection stopped vehicle determiner.

2. The travel control device according to claim 1, wherein the vehicle stop position predictor predicts the stop position at the intersection by obtaining a change of a travel speed of each forward vehicle from a change in the distance information from the own vehicle to each forward vehicle, determines whether or not the forward vehicle is the stopped vehicle to be stopped at the intersection based on the predicted stop position, and further predicts the stop position of the own vehicle at the intersection.

3. The travel control device according to claim 1, wherein the intersection stopped vehicle determiner estimates a distance from a center of the intersection to a stop line based on attribute information of the intersection, sets a stop position estimation range adding a fixed distance to the estimated distance, to thereby determine as the stopped vehicle the forward vehicle that is stopped within the stop position estimation range, and determine as the parked vehicle the forward vehicle whose stop position deviates from the stop position estimation range.

4. The travel control device according to claim 3, wherein the intersection stopped vehicle determiner expands the stop position estimation range when it is determined that the forward vehicles are stopped successively based on the distance information from the own vehicle to each forward vehicle and the distance information to the intersection.

5. The travel control device according to claim 1, wherein the ECU further comprises:
    a travel mode switcher that executes to switch between at least: a forward vehicle follow-up travel mode that performs the forward vehicle follow-up traveling function that travels using a speed of the followed vehicle as a target; and
    an intersection deceleration mode that performs deceleration using the stop position of the own vehicle predicted by the vehicle stop position predictor as a target even if the followed vehicle does not start decelerating yet.

6. The travel control device according to claim 5, wherein the travel mode switcher releases the intersection deceleration mode when it is determined that the forward vehicle determined as the stopped vehicle by the intersection stopped vehicle determiner starts proceeding.

7. The travel control device according to claim 5, wherein the travel mode switcher delays a time when the intersection deceleration mode is released based on the number of the stopped vehicles when it is determined that the forward vehicle determined as the stopped vehicle by the intersection stopped vehicle determiner starts proceeding.

8. The travel control device according to claim 5, wherein the travel mode switcher has the intersection deceleration mode that decelerates at a deceleration that differs for each type of a driving source of the own vehicle, and executes to switch the intersection deceleration mode according to the type of the driving source.

9. The travel control device according to claim 8, wherein the ECU further comprises a travel speed controller that controls an upper speed limit at which the own vehicle enters an idling stop, wherein
    when the type of the driving source of the own vehicle is a combustion engine, the travel speed controller sets the upper speed limit, that enters the idling stop during execution of the intersection deceleration mode, higher as compared to a case that is not the intersection deceleration mode.

10. The travel control device according to claim 5, wherein
    the intersection stopped vehicle determiner notifies a driver that the intersection deceleration mode is executed through a notification device equipped in the own vehicle, when the travel mode switcher executes to switch to the intersection deceleration mode.

11. The travel control device according to claim 1, wherein
    the intersection stopped vehicle determiner notifies a driver that a stop of the own vehicle at the intersection is predicted through a notification device equipped in the own vehicle, when it is determined that the forward vehicle is the stopped vehicle.

12. The travel control device according to claim 1, wherein the ECU further comprises a forward vehicle detection device that acquires the distance information from the own vehicle to each forward vehicle using a millimeter radar or an inter-vehicle communication.

* * * * *